C. WEANER.
SHOCK FORMING MACHINE.
APPLICATION FILED JUNE 15, 1915.
1,177,747.
Patented Apr. 4, 1916.
3 SHEETS—SHEET 1.
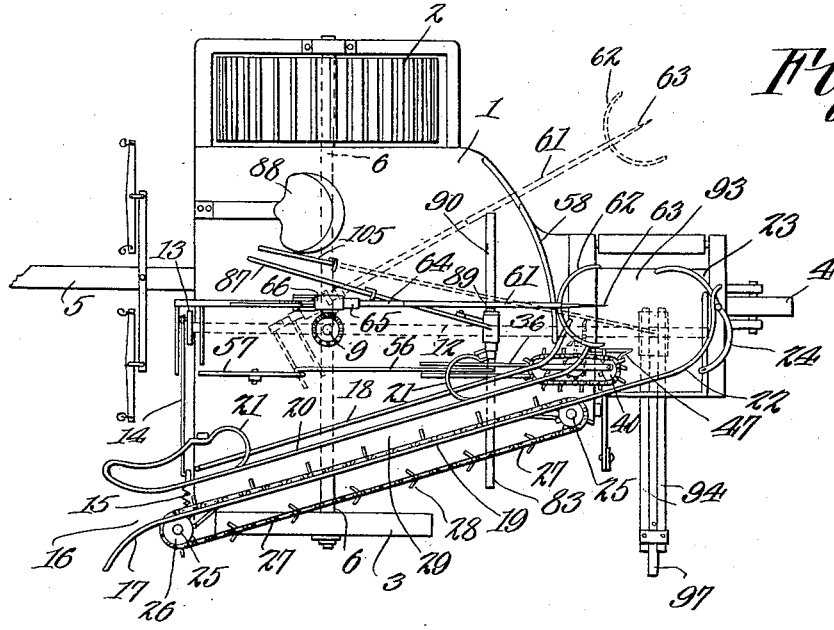
Fig. 1.
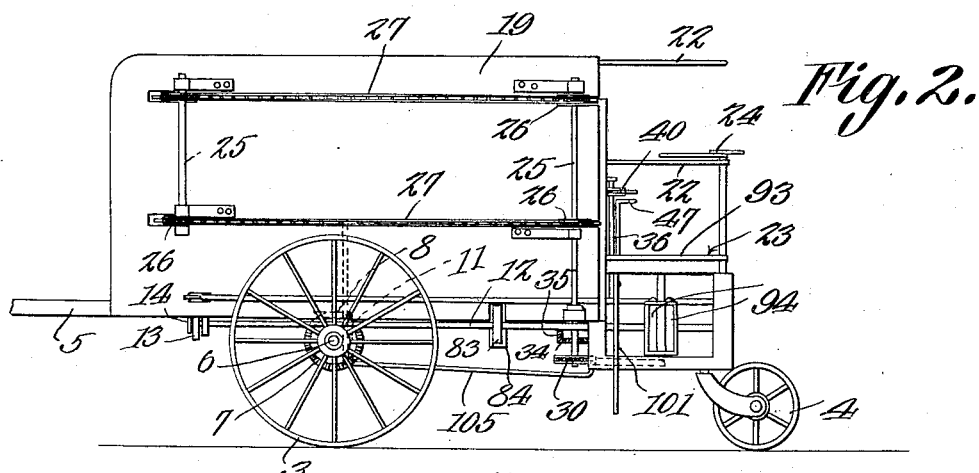
Fig. 2.
Fig. 11.
Witnesses
J. R. Gemlin
R. L. Parker.
C. Weaner
Inventor,
by C. A. Snow & Co.
Attorneys.
THE COLUMBIA PLANOGRAPH CO., WASHINGTON, D. C.

C. WEANER.
SHOCK FORMING MACHINE.
APPLICATION FILED JUNE 15, 1915.
1,177,747.
Patented Apr. 4, 1916.
3 SHEETS—SHEET 2.
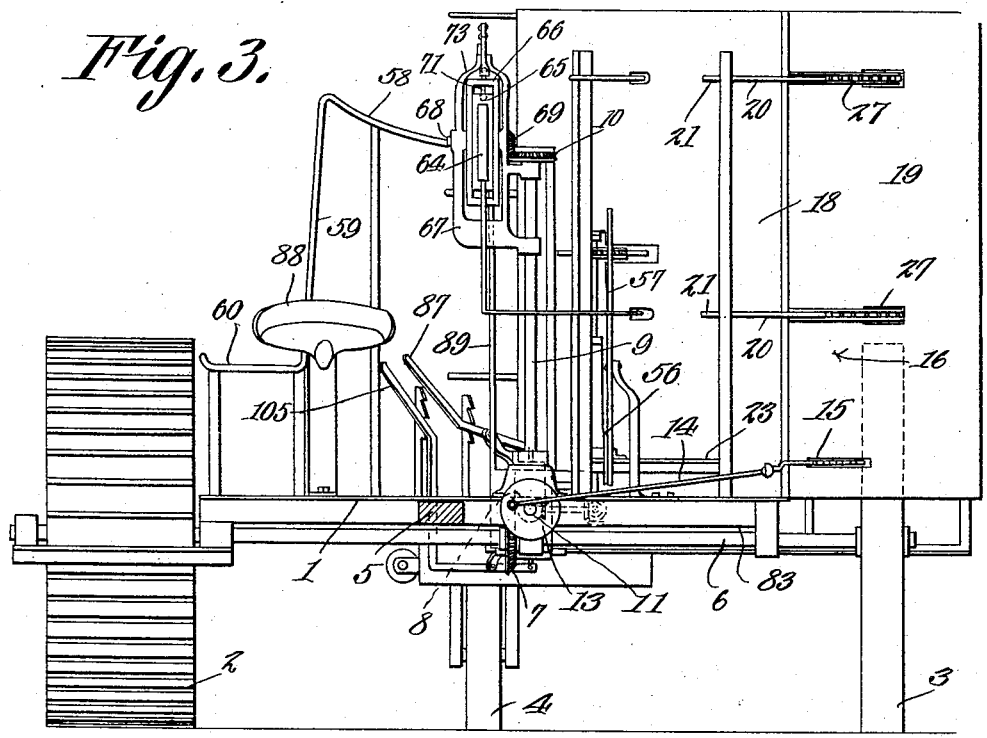
Fig. 3.
Fig. 4.
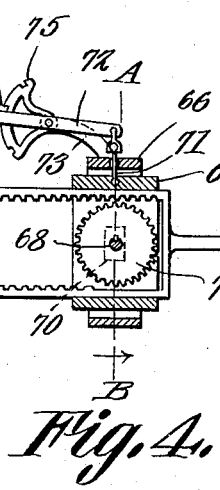
Fig. 5.
Witnesses
C. Weaner
Inventor,
by C. A. Snow & Co.
Attorneys.

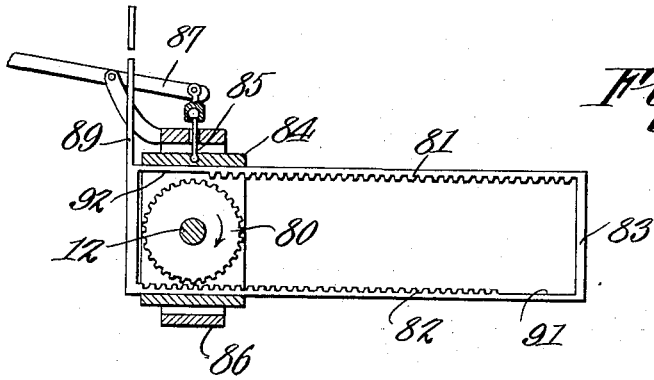
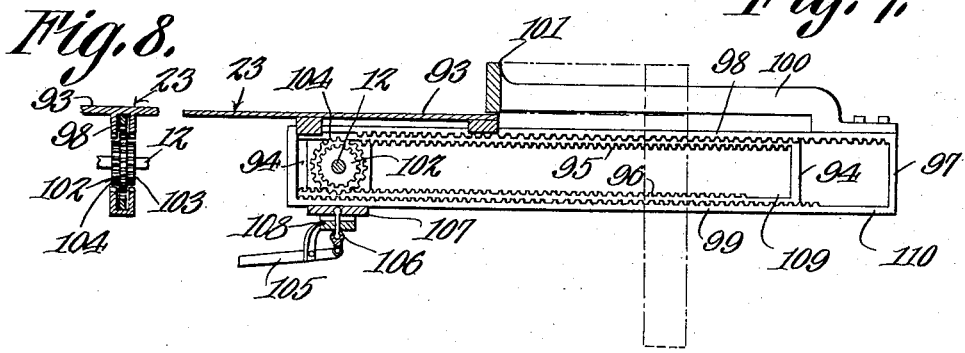
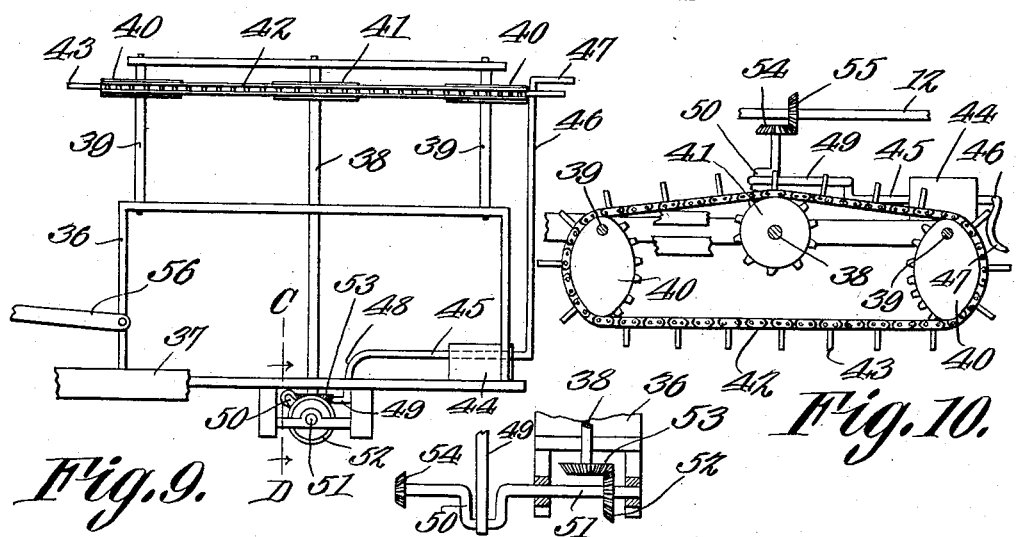

UNITED STATES PATENT OFFICE.

CORNELIUS WEANER, OF RISINGSUN, OHIO, ASSIGNOR OF ONE-FIFTH TO J. A. MINNICK, ONE-FIFTH TO ROY STAHL, ONE-FIFTH TO B. F. HARVEY, AND ONE-FIFTH TO C. H. BROWN, ALL OF RISINGSUN, OHIO.

SHOCK-FORMING MACHINE.

1,177,747.   Specification of Letters Patent.   Patented Apr. 4, 1916.

Application filed June 15, 1915. Serial No. 34,272.

*To all whom it may concern:*

Be it known that I, CORNELIUS WEANER, a citizen of the United States, residing at Risingsun, in the county of Wood and State of Ohio, have invented a new and useful Shock-Forming Machine, of which the following is a specification.

This invention relates to machines for forming shocks, one of its objects being to combine with a corn harvester a shock forming mechanism including means for packing the stalks together where they will be operated on by a tying mechanism, there being additional means for subsequently removing the shock and depositing it in a standing position on the ground.

A further object is to provide a novel form of packing means for directing the stalks to the tying mechanism.

Another object is to provide improved means for engaging the shock and lifting it from the machine, said means being constantly under the control of the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a top plan view of the machine. Fig. 2 is a side elevation thereof. Fig. 3 is an enlarged front elevation, the draft tongue being shown in section. Fig. 4 is a detail view of the shock engaging fork and its operating means. Fig. 5 is an enlarged section on line A—B Fig. 4. Fig. 6 is a view partly in elevation and partly in section of the fork shifting mechanism. Fig. 7 is a section taken from one side to the other through the platform and the push-off mechanism. Fig. 8 is a detail view of the rack used in connection with the push-off mechanism. Fig. 9 is an elevation of the slidable packing mechanism. Fig. 10 is a plan view thereof. Fig. 11 is a horizontal section through a portion of the mechanism and showing partly in plan, the means for transmitting motion from the main drive shaft to the stalk feeding means. Fig. 12 is an enlarged section on line C—D Fig. 9.

Referring to the figures by characters of reference 1 designates a platform having supporting wheels 2 and 3 at the sides thereof and another wheel 4 at the rear thereof, there being a forwardly extending draft tongue 5. The wheel 2 constitutes means for rotating the axle 6, this axle serving to drive the mechanism carried by the machine.

Secured to and rotating with the axle 6 is a gear 7 which constantly meshes with a gear 8 secured to the lower end of a vertical shaft 9 extending upwardly through the platform 1 and which vertical shaft has a gear 10 at its upper end. Gear 8 also meshes with and is adapted to drive a smaller gear 11 secured to a longitudinal shaft 12 that extends over the axle 6 from front to rear of the machine. Secured to the front end portion of this shaft 12 is a disk 13 connected, by a pitman 14, to a reciprocating sickle bar 15 adapted to work within a throat 16 formed between forwardly diverging gathering members 17 provided at the front ends of substantially parallel upstanding guide walls 18 and 19. Presser rods 20 may be arranged along the guide member or wall 18 and within the space between the two walls 18 and 19, these rods being supported by springs 21 so that they serve yieldingly to press material toward the wall 19. Certain of the gathering fingers may be formed integral with these rods as shown. The rear portion of the outer wall 19 is extended rearwardly and laterally, as at 22, the said end overhanging a platform extension 23 and being extended close to a tying mechanism such as indicated generally at 24 and which, specifically, constitutes no part of the present invention but can be of any well known type, the said tying mechanism being positioned to tie together standing stalks supplied to the platform extension 23.

Upstanding shafts 25 are journaled adjacent the gathering member at the front end of wall 19 and adjacent the extension 22 at the rear end of said wall, as shown, each of these shafts being provided with sprockets 26 engaged by endless chains 27. The inner flights of the chains travel along the inner side of the wall 19 and said chains are provided with angular teeth 28 pivotally connected to them and adapted, when moving rearwardly with the inner flights of the chains, to drag along the inner surface of wall 19 so as thus to be held extended transversely across the stalk receiving passage 29 formed between the two walls. The shafts 25 and chains 27 may be driven in any suitable manner. For example, a sprocket 30 may be secured to the lower end of one of the shafts 25 and driven by a chain 31 engaging another sprocket 32 secured to a shaft 33 carrying a bevel gear 34. This bevel gear meshes with a gear 35 secured to the shaft 12, these parts being shown particularly in Fig. 11.

The rear end portions of the wall 18 and of the rods 20 are curved laterally as shown and extend past a packing mechanism of novel form. As shown particularly in Figs. 9 and 10, this packing mechanism includes an upstanding frame 36 slidably mounted in guides 37 and provided with a central upstanding drive shaft 38 and with end shafts 39. On the end shafts 39 are secured elliptical sprockets 40 and a similar sprocket may be secured to the shaft 38 or, if preferred, an ordinary sprocket may be secured to said shaft 38, as indicated at 41. These sprockets engage an endless chain 42 having outstanding teeth 43. A guide block 44 is carried by the frame 36 and slidably mounted therein is a bar 45 having an upstanding arm 46 terminating in a bowed packing finger 47. Arm 46 and finger 47 are located beyond the rear end of the upstanding frame 36. The forward end of bar 45 is provided with a hanger 48 connected, by a pitman 49, to a crank 50 on a shaft 51 which is supported below and moves with the upstanding frame 36. A bevel gear 52 is secured to shaft 51 and constantly meshes with a bevel gear 53 at the lower end of shaft 38. Another bevel gear 54 is secured to one end portion of the shaft 51 and is adapted, when the frame 36 is pushed rearwardly to one limit of its movement, to mesh with a gear 55 secured to the shaft 12. However, when the frame 36 is pulled forwardly away from its rearmost position, gear 54 will move out of mesh with gear 55.

A rod 56 is pivotally connected to the slidable frame 36 and to one end of a lever 57 mounted on the platform 1. When the upper end of the lever 57 is pushed rearwardly, the slidable frame 36 will be drawn forwardly out of position across the rear end of the passage 29, and out of position above the platform extension 23. When the upper end of lever 57 is pushed rearwardly, slidable frame 36 will be shifted rearwardly to position partly across the stalk passage 29 and partly over the platform extension 23.

When the slide is in this last named position, gears 54 and 55 are in mesh so that motion is thus transmitted from shaft 12 to the sprocket 41 and the chain actuated thereby. As the chain is mounted on elliptical sprockets, the actuation of the chain and sprockets will result in a bodily movement of the chain laterally toward and from the wall 19 while at the same time that flight of the chain nearest wall 19 will be moved rearwardly.

Extending transversely of the platform 1 in front of the platform extension 23 is an arcuate supporting rail 58 terminating, at one end, in a depending arm 59 at the lower end of which is arranged a laterally extending supporting rail 60, this supporting rail 60 being located adjacent that side of the machine remote from the stalk passage 29. Rails 58 and 60 constitute supports for the stem 61 of the shock engaging fork, this fork including a yoke 62 from the center of which extends a prong 63. Stem 61 projects from the rear end of a rectangular frame 64 mounted to slide within a guide frame 65 which is mounted for up and down movement within an outer frame 66. This outer frame is secured in a holding bracket 67 which is supported by and mounted to swing upon the upstanding shaft 9. A transverse shaft 68 is journaled in the frame 66 and the bracket 67 and has a bevel gear 69 constantly meshing with gear 10. Shaft 68 is extended through openings 70 in the sides of the frame 65 and a link 71 connects the top of frame 65 to one end of a lever 72 which is fulcrumed on an arm 73 extending from the bracket 67. This lever is provided with a dog 74 for engaging a notched segment 75 whereby the lever can be held in any position to which it may be adjusted.

Formed on or secured to the upper face of the bottom of frame 64 is a rack 76 and another rack 77 is formed on or secured to the lower face of the top of frame 64. The distance between the racks is slightly greater than the diameter of a gear 78 which is secured to shaft 68 and is located within the frame 64. The rear end of the lower rack 76 terminates short of the end of the frame 64 and the same is likewise true of the front end of the upper rack 77. It is to be understood that the gear 78 is normally out of mesh with both of the racks. When lever 72 is shifted in one direction the upper rack 77 will be lowered into mesh with the rotating gear 78, with the result that the frame 64 will be slid rearwardly until the rack 77 is moved out of mesh with gear 78, whereupon the movement of the frame 64 will come to a stop. By shifting lever 72 in the opposite direction, rack 76 will be elevated into mesh with gear 78 and frame 64 will be caused to move forwardly, until rack 76 moves out of mesh with gear 78 when the frame will come to a stop. It will be obvious of course that by means of lever 72 the bracket 67 and all of the parts carried thereby can be swung about the shaft 9 as an axis. Frame 64 has depending angular fingers 79 adapted to receive between them the upper portion of lever 57. It will be obvious that when the stem 61 is in its normal position, as shown in Fig. 1, resting on one end portion of the rail 58, one of the fingers 79 will, during the rearward movement of the stem 61 and frame 64, engage lever 57 and actuate it so as to withdraw the packing mechanism from position over the platform extension 23. The fingers 79 will remain in engagement with lever 57 while stem 61 is swung laterally so as to slide along rail 58. When stem 61 is moved forwardly with frame 64 one of the fingers 79 will engage the upper end of lever 57 and thrust it forwardly, thus to project the packing mechanism backwardly to its normal or active position.

For the purpose of swinging the stem 61 and the parts coupled thereto laterally, special mechanism, such as illustrated in Fig. 6, has been provided. This mechanism includes a gear 80 mounted for rotation with shaft 12 and between upper and lower racks 81 and 82 respectively which form the upper and lower portions of a frame 83. This frame is slidably mounted within a guide 84 suspended, by a link 85 within a holding frame 86, said link 85 being attached to one end of a lever 87 which extends forwardly to a point where it can be readily reached by the occupant of the seat 88. A standard 89 extends upwardly from one end of the frame 83 and across one side of the stem 61. This standard is not secured to the stem but is merely adapted to bear thereagainst. A transverse slot 90 is formed in platform 1 to permit movement of the standard 89.

One end of the rack 82 is cut away, as indicated at 91 while the other end of rack 81 is cut away, as indicated at 92. Thus it will be seen that when frame 83 is raised, rack 82 will be brought into mesh with the constantly rotating gear 80 with the result that the standard 89 will press against the side of stem 61 and cause said stem to swing laterally along rail 58 and out of position above the platform extension 23, whereupon it will drop onto the lower rail 60. By lowering frame 83, rack 81 will be brought into mesh with gear 80 and standard 89 returned to its initial position. Stem 61 can be returned to its normal position in any desired manner, as by pressing laterally on lever 72. The platform extension 23 is provided with a laterally slidable deck 93 connected to frame 94 thereunder, this frame being provided with upper and lower racks 95 and 96 respectively, said racks being arranged in pairs. Another frame 97 is interposed between the pairs of upper and lower racks 95 and 96 and is provided with an upper rack 98 and a lower rack 99. This frame 97 is longer than the frame 94 and has secured to its outer end one end of an arm 100 to the other end of which is attached a push-off 101 slidably mounted on the deck 93.

The shaft 12 extends through the frames 94 and 97 and is provided with three gears 102, 103 and 104 which rotate with the shaft. Gears 102 and 103 are adapted to mesh with the racks on frame 94, while the intermediate gear 104 is adapted to mesh with the racks on frame 97. A lever 105 is extended to a point close to the seat 88 and is connected by a link 106 to the guide frame 107 in which the frames 94 and 97 are adapted to reciprocate. This guide frame is slidably mounted within a bracket 108 fixedly mounted.

It will be apparent that the deck 93 is normally positioned in front of and below the tying mechanism 24 and where it can receive stalks from the passage 29 and support them on end. The push-off 101 is normally located above that side of the deck nearest the passage 29. Gears 102, 103 and 104 are constantly rotating with shaft 12 but are normally out of mesh with the respective racks. When it is desired to shift the deck 93 and the push-off 101, the operator actuates lever 105 so as to elevate the frame 107 and the slidable frames mounted therein. Thus the racks 96 and 99 will be brought simultaneously into mesh with the gears 102, 103 and 104, with the result that the two frames 94 and 97 will be simultaneously shifted transversely of the machine. As the racks on frame 97 are longer than the racks on frame 94 it will be apparent that when the gears 102 and 103 reach the cut away portions 109 of rack 96, frame 94 will be brought to a stand while gear 104, which continues in mesh with rack 99, will produce a continued movement of frame 97 with the result that the push-off 101 will slide over the deck 93 and thrust therefrom the standing shock. This independent movement of frame 97 will continue until the cut away portion 110 of its rack 99 comes under the gear 104. When it is desired to return the parts to their initial positions, the foregoing operation is reversed, the frames 94 and 97 being lowered to bring their racks into engagement with the respective gears.

Assuming that the parts are in their normal positions, with the prong 63 resting close to the rail 58 and the packing mechanism positioned as in Fig. 1, it will be seen that when the machine is drawn forward the stalks in a row will be gathered by the members 17 so as to be severed by the sickle bar 15. The severed stalks will be engaged by the inner flight of the moving chain 27 and caused to move rearwardly within the passage 29 while in standing position, the stalks being ultimately engaged by the packing chain 42 which has the peculiar movement hereinbefore described whereby the standing stalks are firmly gripped and thrust rearwardly onto the deck 93 of the platform extension. This thrusting of the stalks toward the tying mechanism 24 is further facilitated by the packing fingers 47 operated by the crank 50. After a sufficient number of stalks have accumulated on the deck 93 to form a shock of predetermined proportions, the tying mechanism 24 is set in motion in the usual manner so as to tie the stalks together near their tops. Lever 72 is then shifted so that the stem 61 will be thrust rearwardly, causing prong 63 to enter the upper portion of the shock and the yoke 62 to straddle the shock. With the parts thus located, the two levers 87 and 105 are actuated so as to cause the gears 80 and 102, 103 and 104 to simultaneously shift the frames 83, 94 and 97 so that the stem 61 will be moved laterally along the rail 58 while the deck 93 and the push-off 101 are also moving laterally at approximately the same speed. The parts are so timed and proportioned that as the deck 93 comes to a stop, the stem 61 and the push-off 101 will continue to swing laterally and the push-off will thus thrust the standing shock off of the deck 93. Simultaneously with this movement, the stem 61 passes over the end of the rail 58 and drops onto the rail 60. Thus it will be seen that the shock will be maintained in an upstanding position while falling and will be deposited on the ground where it will remain in a standing position, the machine continuing to move forward and such movement resulting in the withdrawal of prong 63 from the standing shock. During the operation of the stem 61 the packing mechanism will be shifted out of and back into active position as hereinbefore described. By now again actuating levers 87 and 105, the parts of the apparatus can be caused to return to their initial positions, whereupon the formation of a new shock can proceed as hereinbefore pointed out.

What is claimed is:—

1. The combination with a supporting structure, and shock forming means upon said structure, of a continuously rotating gear, a prong, opposed racks movable with the prong, means for elevating one of the racks into engagement with the gear to project the prong into the formed shock, means for moving the other rack into engagement with the gear to withdraw the prong from the shock, and means for swinging the prong laterally to remove the shock from the supporting structure.

2. In combination with a shock forming mechanism, a continuously revoluble upstanding shaft, and a bracket mounted to swing upon the shaft, of connected upper and lower racks, a prong movable with the racks, a gear interposed between and normally out of mesh with the racks, means for transmitting motion to said gear from the upstanding shaft, means for shifting one of the racks into engagement with the gear to project the prong into engagement with the formed shock, and for moving the other rack into engagement with the gear to withdraw the prong from the shock, a guide rail, a prong carrying stem movably engaging the guide rail, and means for swinging the prong and bracket about the upstanding shaft, thereby to shift the engaged shock laterally from the shock former and onto the ground.

3. In a machine for forming shocks, a platform, a platform extension, harvesting mechanism, means for directing the stalks in upstanding position from the harvesting mechanism and onto the platform extension, tying mechanism, packing mechanism for directing stalks to the tying mechanism, a shock engaging element, means for thrusting said element into engagement with the shock upon the platform extension, means for moving said element laterally and mechanism controlled by said element when moving laterally with the engaged shock, for withdrawing the packing mechanism from active position.

4. In a shock forming machine, a platform, a platform extension, tying mechanism, means for harvesting stalks, means for directing the harvested stalks in upstanding position to the tying mechanism, a prong, a guide rail therefor, means for directing the prong into engagement with the formed shock, means for shifting the prong laterally with the engaged shock, means for shifting the platform extension simultaneously with the prong and shock, and means for thrusting the shock from the platform extension.

In testimony that I claim the foregoing as my own, I have hereto affixed my signature in the presence of two witnesses.

CORNELIUS WEANER.

Witnesses:
J. A. MINNICK,
C. H. BROWN.

Copies of this patent may be obtained for five cents each, by addressing the "Commissioner of Patents, Washington, D. C."